US008857843B2

(12) United States Patent
 Callahan et al.

(10) Patent No.: US 8,857,843 B2
(45) Date of Patent: Oct. 14, 2014

(54) AERODYNAMIC BICYCLE FRAME

(71) Applicant: Specialized Bicycle Components, Inc., Morgan Hill, CA (US)

(72) Inventors: Jean-Luc Callahan, San Jose, CA (US); Christopher D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/954,662

(22) Filed: Jul. 30, 2013

(65) Prior Publication Data

US 2013/0313804 A1 Nov. 28, 2013

Related U.S. Application Data

(63) Continuation of application No. 11/691,627, filed on Mar. 27, 2007, now Pat. No. 8,496,262.

(51) Int. Cl.
  *B62K 3/02* (2006.01)
  *B62K 3/04* (2006.01)
  *B62K 19/02* (2006.01)
  *B62K 25/02* (2006.01)

(52) U.S. Cl.
  CPC . *B62K 3/02* (2013.01); *B62K 25/02* (2013.01); *B62K 19/02* (2013.01); *B62K 3/04* (2013.01)
  USPC ...................................... 280/288; 280/281.1

(58) Field of Classification Search
  USPC ............................. 280/281.1, 284, 285, 288
  See application file for complete search history.

(56) References Cited

U.S. PATENT DOCUMENTS

| 625,456 | A | 5/1899 | Mills |
| 723,486 | A | 3/1903 | Pierce |
| 2,132,317 | A | 10/1938 | Pease |
| 3,419,283 | A | 12/1968 | Newland |

(Continued)

FOREIGN PATENT DOCUMENTS

| DE | 3211383 | 10/1983 |
| FR | 324600 | 9/1902 |
| TW | 306897 | 6/1997 |
| TW | 509193 | 9/2002 |

OTHER PUBLICATIONS

EP08005385 Search Report date Jun. 9, 2008.
EP08005385 Examination Report date Apr. 18, 2013 (5 pages).

*Primary Examiner* — Anne Marie Boehler
*Assistant Examiner* — Maurice Williams
(74) *Attorney, Agent, or Firm* — Michael Best & Friedrich LLP

(57) ABSTRACT

A bicycle including a main frame, a front wheel mounted for rotation relative to the main frame. a rear dropout, and a rear wheel mounted for rotation relative to the rear dropout about an axis. The rear wheel defines a center plane of the bicycle and is driven by a chain. The bicycle also includes a seat stay coupling the rear dropout to the main frame. The seat stay has an inner surface facing the rear wheel and an outer surface facing away from the rear wheel. The seat stay includes a steep portion having an outer surface disposed at a steep angle of between about 25 degrees and about 75 degrees relative to the center plane, and at least a portion of the steep portion is disposed outboard of the chain.

18 Claims, 9 Drawing Sheets

(56) References Cited

U.S. PATENT DOCUMENTS

| | | |
|---|---|---|
| 4,733,881 A | 3/1988 | Mueller |
| 4,850,607 A | 7/1989 | Trimble |
| 4,900,050 A | 2/1990 | Bishop et al. |
| RE33,295 E | 8/1990 | Trimble |
| D313,381 S | 1/1991 | Moeller |
| 4,982,975 A | 1/1991 | Trimble |
| 5,011,172 A | 4/1991 | Bellanca et al. |
| 5,221,102 A | 6/1993 | Spangler |
| D347,603 S | 6/1994 | Fritschen |
| D349,869 S | 8/1994 | Burrows et al. |
| 5,452,911 A | 9/1995 | Klein et al. |
| 5,476,278 A | 12/1995 | Levin et al. |
| D369,330 S | 4/1996 | Hill et al. |
| D372,002 S | 7/1996 | Busby et al. |
| 5,544,907 A | 8/1996 | Lin et al. |
| 5,588,662 A | 12/1996 | Fortier |
| D393,432 S | 4/1998 | Yelverton |
| D419,110 S | 1/2000 | Allen et al. |
| D419,111 S | 1/2000 | Allen et al. |
| 6,017,048 A | 1/2000 | Fritschen |
| 6,056,307 A | 5/2000 | Busby et al. |
| 6,170,845 B1 | 1/2001 | Tseng |
| D486,424 S | 2/2004 | Sagan |
| 6,889,992 B2 | 5/2005 | Vroomen et al. |
| 6,926,298 B2 | 8/2005 | Ellsworth et al. |
| 6,955,372 B1 | 10/2005 | Fritschen |
| D514,030 S | 1/2006 | Stack |
| D519,885 S | 5/2006 | Thompson |
| 7,114,738 B1 | 10/2006 | Chen |
| 7,121,569 B1 | 10/2006 | Chubbuck et al. |
| 7,140,628 B2 | 11/2006 | Parkin |
| 7,537,232 B2 | 5/2009 | Yu |
| D593,457 S * | 6/2009 | Talavasek et al. ............ D12/111 |
| 2002/0033586 A1 | 3/2002 | Vroomen et al. |
| 2003/0067137 A1 | 4/2003 | Chen |
| 2004/0061305 A1 | 4/2004 | Christini |
| 2005/0151344 A1 | 7/2005 | Parkin |
| 2006/0119069 A1 | 6/2006 | D'Aluisio et al. |
| 2006/0226632 A1 | 10/2006 | Chuang |

\* cited by examiner

AERODYNAMIC BICYCLE FRAME

BACKGROUND

The present invention relates to bicycles, and more particularly to frames for bicycles.

Bicycle frames typically include a top tube, a down tube, a seat tube, and a head tube. The top tube and the down tube are typically interconnected near the front of the bicycle by the head tube. The seat tube interconnects the down tube and the top tube behind the head tube typically near a middle portion of the bicycle. A bottom bracket that supports a crank set is often located near an intersection of the down tube and the seat tube. The crank set is utilized by the rider to drive the rear wheel. In many bicycles, a seat post is received in the seat tube, above the top tube. The seat post is secured to a seat that supports the rider on the bicycle. A typical bicycle frame also includes rear dropouts for receiving a rear wheel. The rear dropouts are commonly connected to the remainder of the frame by stays, such as seatstays and chainstays, as is known in the art.

SUMMARY

In one embodiment, the invention provides a bicycle that includes a main frame, a front wheel mounted for rotation relative to the main frame, a rear dropout, and a rear wheel mounted for rotation relative to the rear dropout. The rear wheel defines a center plane of the bicycle. The bicycle further includes a rear stay that couples the rear dropout to the main frame. The rear stay has an inner surface facing the rear wheel and an outer surface facing away from the rear wheel. The rear stay includes a steep portion having an outer surface at a steep angle of between about 25 degrees and about 75 degrees relative to the center plane.

In another embodiment, the invention provides a bicycle where the front and rear wheels support the bicycle on a ground surface. A rear stay couples the rear dropout to the main frame. The rear stay has a rear portion adjacent the dropout and at a first angle relative to the center plane and a front portion adjacent the main frame and at a second angle relative to the center plane and a steep portion between the front and rear portions and at a steep angle relative to the center plane. The steep angle is larger than the first angle and the second angle. The steep portion includes an elongated cross-section defining a major axis that is substantially parallel to the ground surface.

In yet another embodiment, the invention provides a bicycle that includes a rear stay coupling the rear dropout to the main frame. The rear stay includes a rear portion adjacent the dropout and at a first angle relative to the center plane, a front portion adjacent the main frame and at a second angle relative to the center plane, and a steep portion between the first and second portions and at a steep angle relative to the center plane. The steep angle is larger than the first angle and the second angle. The steep portion includes an elongated cross-section having a leading edge and a trailing edge. The leading edge is directly in front of the trailing edge.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
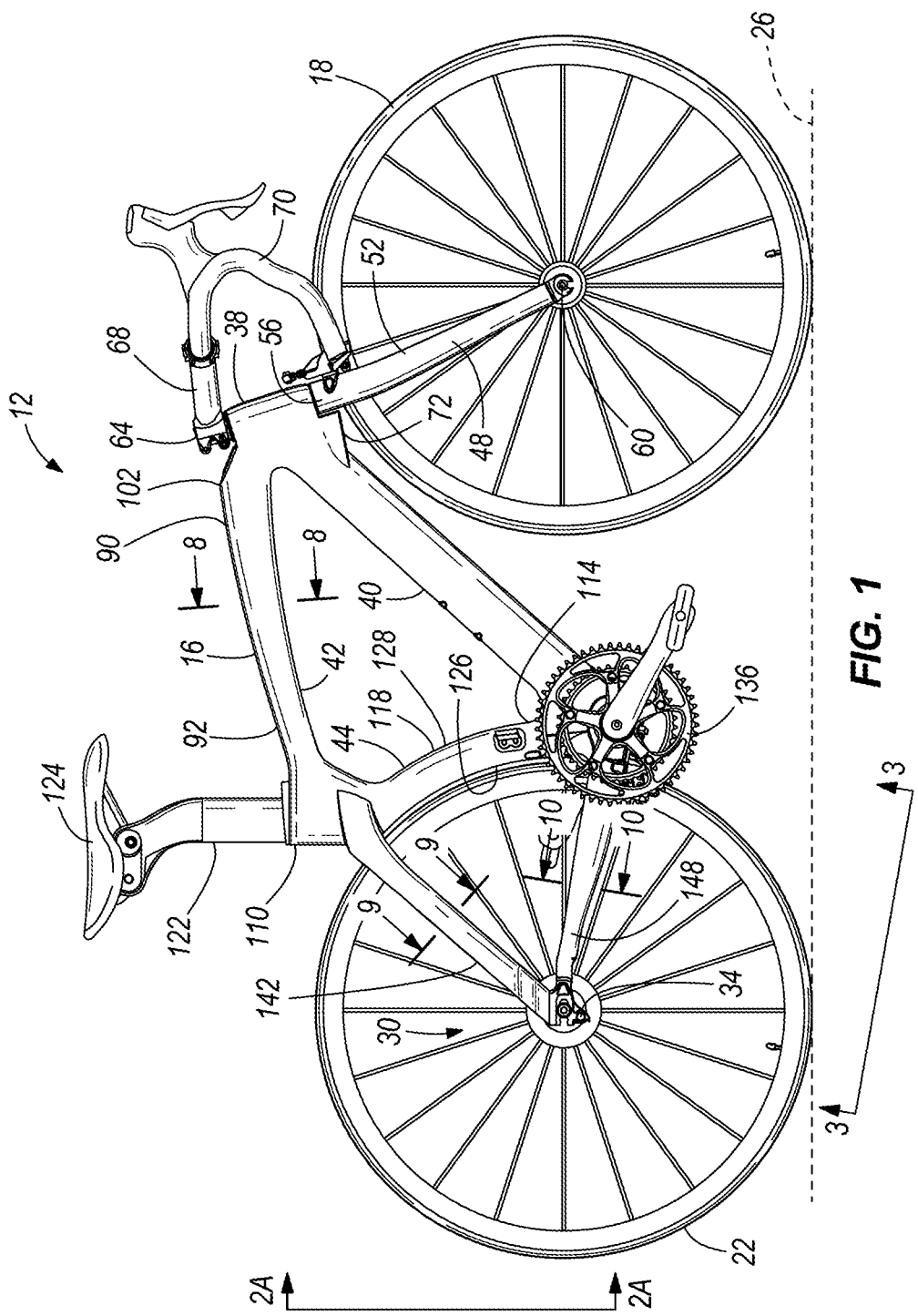
FIG. 1 is a side view of a bicycle that includes a frame embodying the present invention.
Figure 2A:
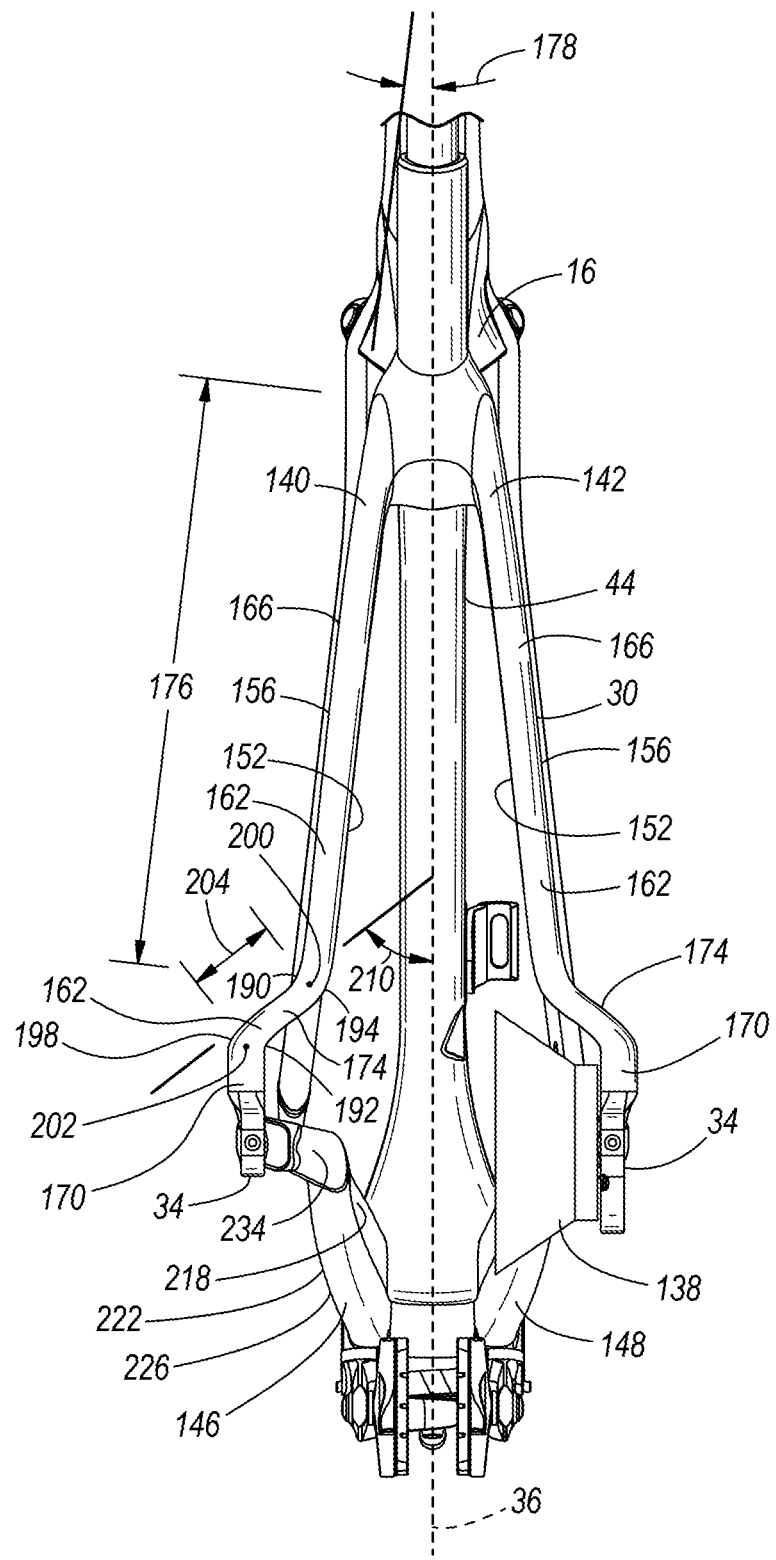
FIG. 2A is a view of the frame of FIG. 1 taken along line 2A-2A of FIG. 1.

FIG. 1 illustrates a bicycle 12 that includes a main frame 16 and a front wheel 18 and a rear wheel 22 that support the main frame 16 above a ground surface 26. As best seen in FIGS. 1 and 2A, the bicycle 12 further includes rear stays 30 and rear dropouts 34. The rear stays 30 couple the rear dropouts 34 to the main frame 16. The rear dropouts 34 rotatably support the rear wheel 22 and couple the rear wheel 22 to the rear stays 30. The rear wheel 22 defines a central plane 36 of the bicycle 12.

Referring to FIG. 1, the main frame 16 includes a head tube 38, a down tube 40, a top tube 42, and a seat tube 44. The head tube 38 interconnects the down tube 40 and the top tube 42, and the head tube 38 rotatably supports a front fork 48. As would be understood by one of skill in the art, a headset, which typically includes bearings, seals, etc., is received within the head tube 38 to rotatably support the front fork 48 with respect to the head tube 38. The front fork 48 includes two fork blades 52 and a fork crown 56 that interconnects the fork blades 52 above the front wheel 18. A front dropout 60 is received within each of the fork blades 52 to couple the front wheel 18 to the fork 48 and to rotatably support the front wheel 18 with respect to front fork 48. A steerer tube 64 extends from the crown 56 of the front fork 48 and extends through the head tube 38. A stem 68 is coupled to the steerer tube 64. The stem 68 interconnects front handlebars 70 and the steerer tube 64. The front handlebars 70 are rotatable with respect to the head tube 38 to pivot the front wheel 18.

Figure 4:
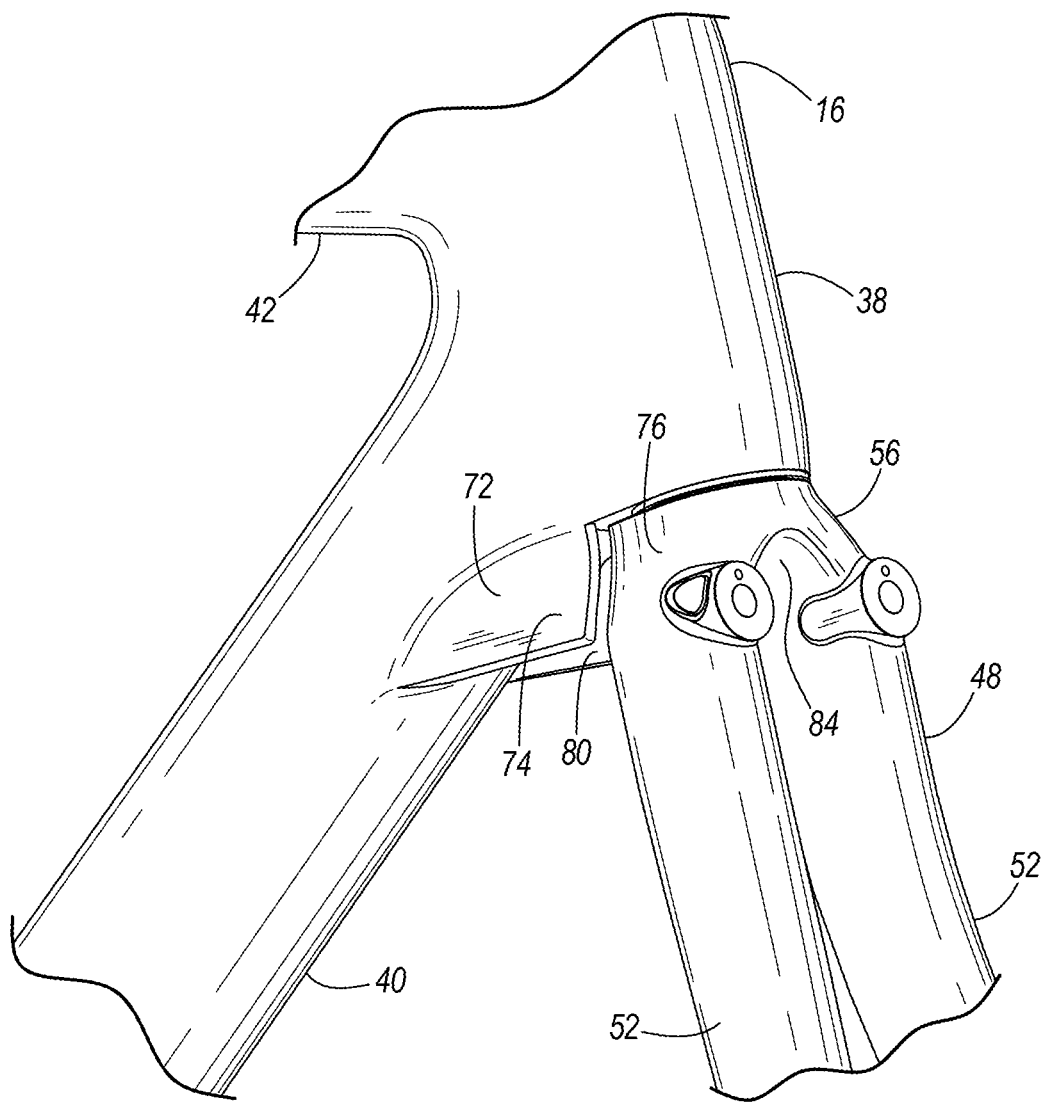
FIG. 4 is a perspective view of a front portion of the frame of FIG. 1 and a front fork of the bicycle of FIG. 1.
Figure 5:
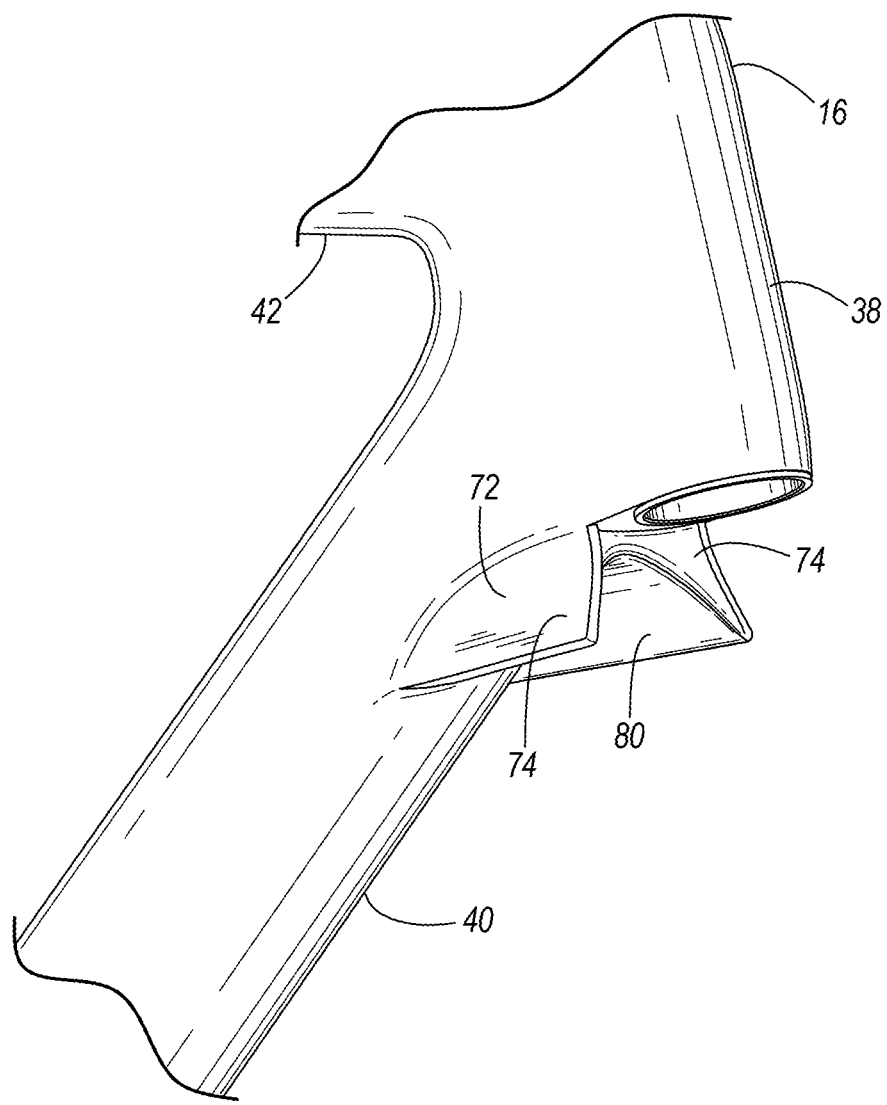
FIG. 5 is a perspective view similar to FIG. 4 with the front fork removed.

Referring to FIGS. 4 and 5, in the illustrated construction, the main frame 16 includes an aerodynamic transition portion 72 between the crown 56 of the front fork 48 and the down tube 40. The transition portion 72 includes outer surfaces 74 that generally conform to the curvature of respective outer surfaces 76 of the fork crown 56. The transition portion 72 further includes a concave inner surface 80 that generally conforms to the curvature of an inner surface 84 of the fork crown 56. The aerodynamic transition portion 72 reduces wind resistance or drag created behind the fork crown 56.

Figure 8:
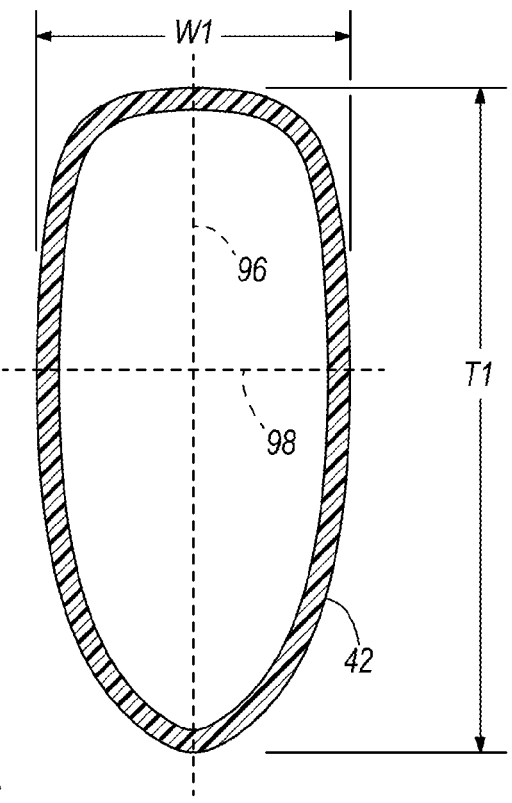
FIG. 8 is a cross-sectional view of a top tube of the frame taken along line 8-8 of FIG. 1.

Referring to FIGS. 1 and 8, the top tube 42 includes a front portion 90 adjacent the head tube 38 and a rear portion 92 adjacent the seat tube 44. The top tube 42 defines a thickness T1 measured along a major axis 96 of the top tube 42 and a width W1 measured along a minor axis 98 of the top tube 42. In the illustrated construction, the thickness T1 decreases from the front portion 90 toward the rear portion 92 or generally from the head tube 38 toward the seat tube 44. The thickness T1 of the front portion 90 is such that the front portion 90 includes an aerodynamic transition portion 102 that extend above the head tube 38 and located directly behind the stem 68. The aerodynamic transition portion 102 reduces wind resistance or drag created behind the stem 68.

Figure 7:
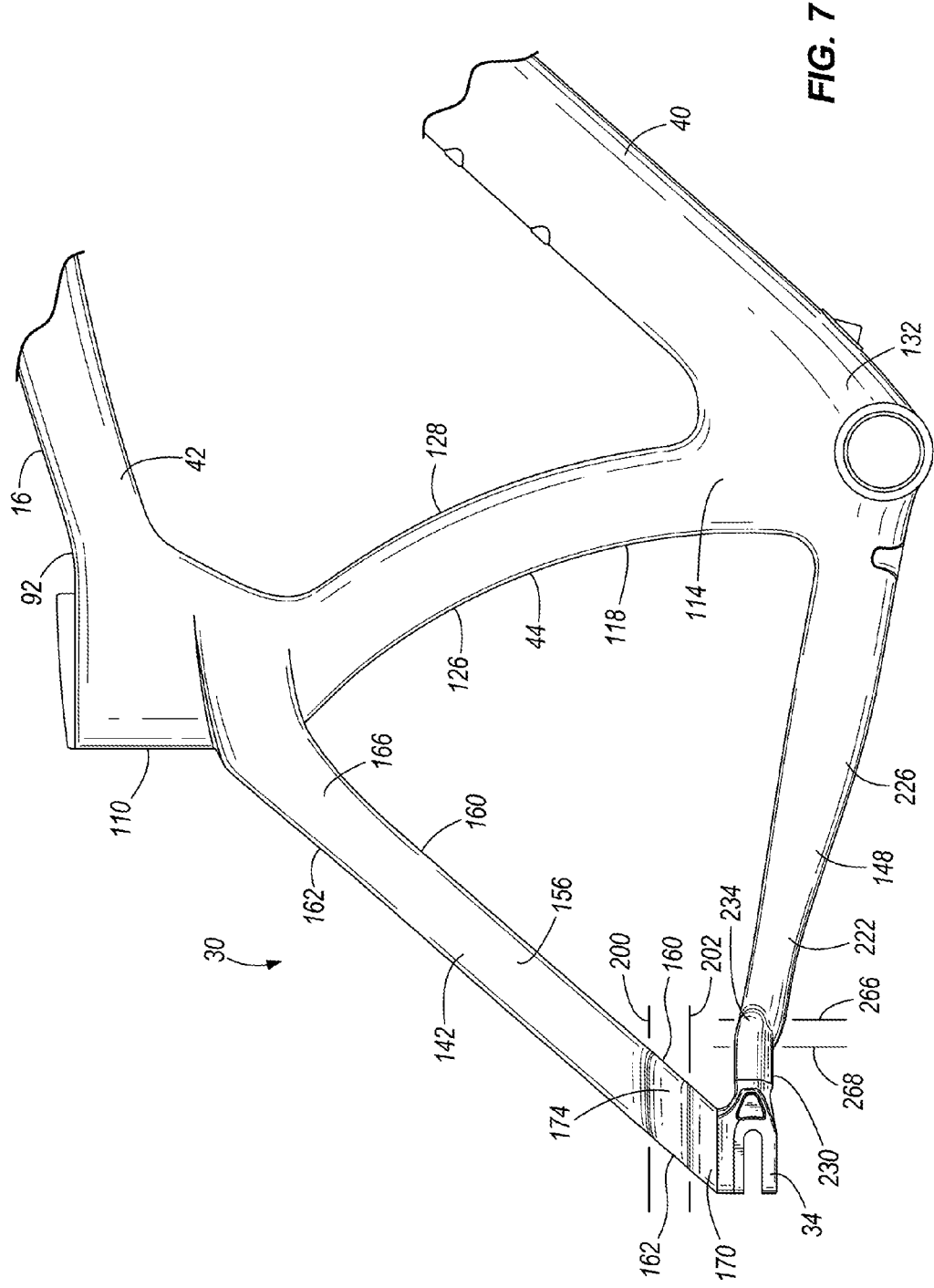
FIG. 7 is a side view of a portion of the frame of FIG. 1.

Referring to FIGS. 1 and 7, the seat tube 44 includes an upper portion 110, a lower portion 114 and a curved transition 118 that interconnects the upper and lower portions 110 and 114. The upper portion 110 receives a seat post 122 that interconnects a saddle or seat 124 to the main frame 16. The curved transition 118 is curved such that a trailing end 126 and a leading end 128 of the transition 118 are curved to generally conform to the curvature of the rear wheel 22.

A bottom bracket 132 is coupled to the seat tube 44 adjacent the lower portion 114 of the seat tube 44. The bottom bracket 132 interconnects the seat tube 44 and the down tube 40. The bottom bracket 132 rotatably supports a crank set 136. As would be understood by one of skill in the art, the crank set 136 and a cassette 138 or set of rear sprockets (schematically illustrated in FIG. 2A) are interconnected using a chain, and the crank set 136 is utilized by a rider of the bicycle 12 to drive the rear wheel 22.

Referring to FIGS. 1 and 2A, the rear stays 30 include left and right seatstays 140, 142 and left and right chainstays 146, 148. The seatstays 140, 142 are coupled to the upper portion 110 of the seat tube 44 and interconnect the seat tube 44 and the rear dropouts 34. The seatstays 140, 142 are similar, and therefore, only the left seatstay 140 will be described in detail below and like components and portions have been given the same reference number.

Figure 9:
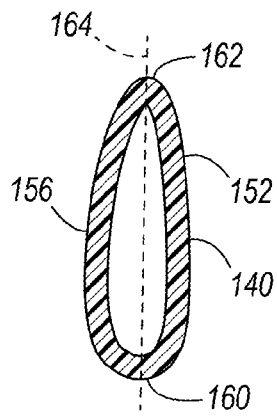
FIG. 9 is a cross-sectional view of a seatstay of the bicycle taken along line 9-9 of FIG. 1.
Figure 10:
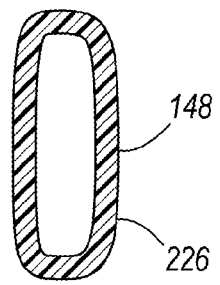
FIG. 10 is a cross-sectional view of a chainstay of the bicycle taken along line 10-10 of FIG. 1.
Figure 11:
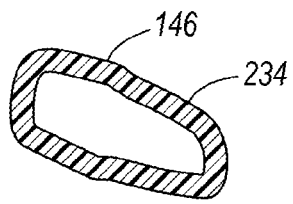
FIG. 11 is a cross-sectional view of the chainstay taken along line 11-11 of FIG. 3.

Referring to FIGS. 1, 2A, 2B, and 9, the seatstay 140 includes an inner surface 152 that generally faces toward the rear wheel 22 and an outer surface 156 that generally faces opposite the inner surface 152 or away from the rear wheel 22. The inner surface 152 and the outer surface 156 converge to define a leading edge 160 and a trailing edge 162. The leading edge 160 is directed toward the front of the bicycle 12 and the trailing edge 162 is directed toward the rear of the bicycle 12. The seatstay 140 is aerodynamically shaped, and the leading edge 160 has a larger radius of curvature than the trailing edge 162. The seatstay 140 defines a major axis 164 that extends through the leading and trailing edges 160 and 162 as illustrated in FIG. 9.

Figure 2B:
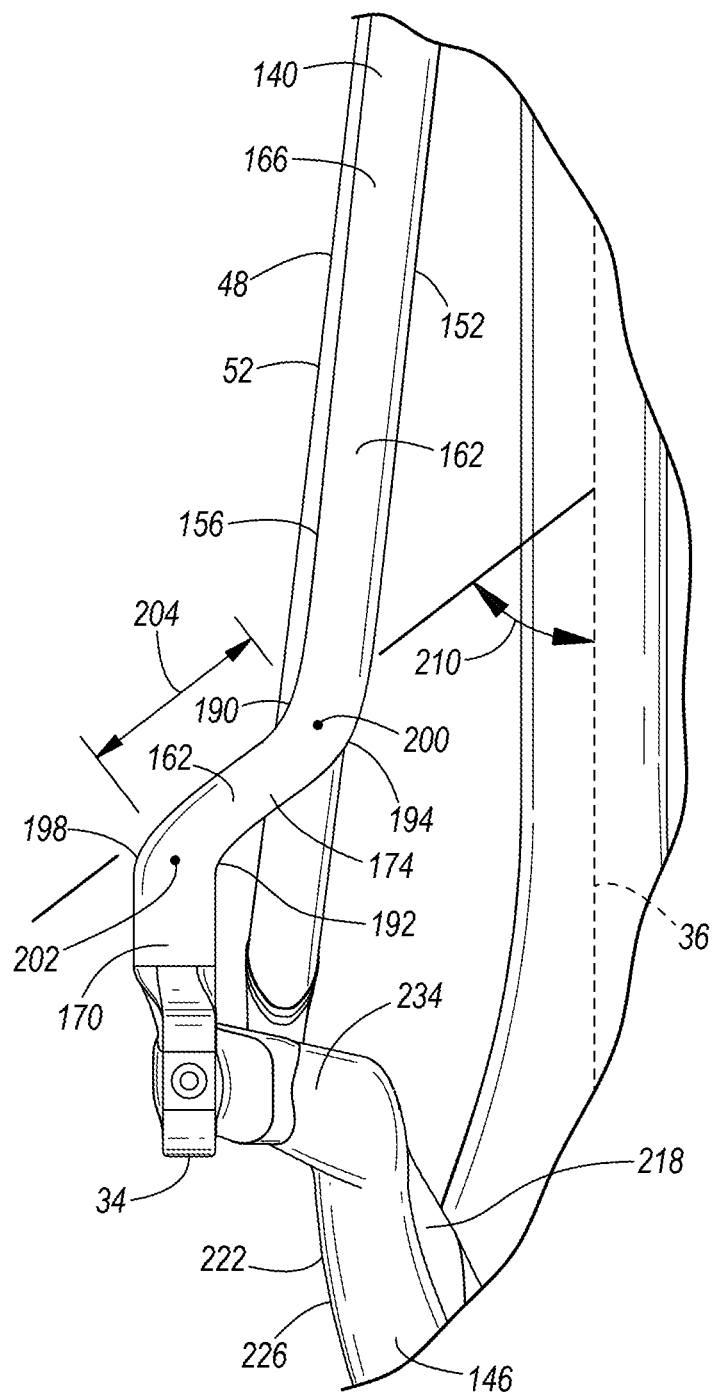
FIG. 2B is an enlarged view of a portion of FIG. 2A.

Referring to FIGS. 2A and 2B, the seatstay 140 further includes a front portion 166, a rear portion 170, and a steep portion 174 between the front and rear portions 166 and 170. The front portion 166 has a length 176 and the outer surface 156 of the front portion 166 defines a front angle 178 with respect to the center plane 36 of the bicycle 12. In the illustrated construction, the front angle 178 is approximately 10 degrees. In other constructions, the front angle 178 can range from about 5 degrees to about 25 degrees. In yet other constructions, the front angle 178 can range from about 0 degrees (i.e., parallel to the center plane 36) to about 50 degrees.

Figure 6:
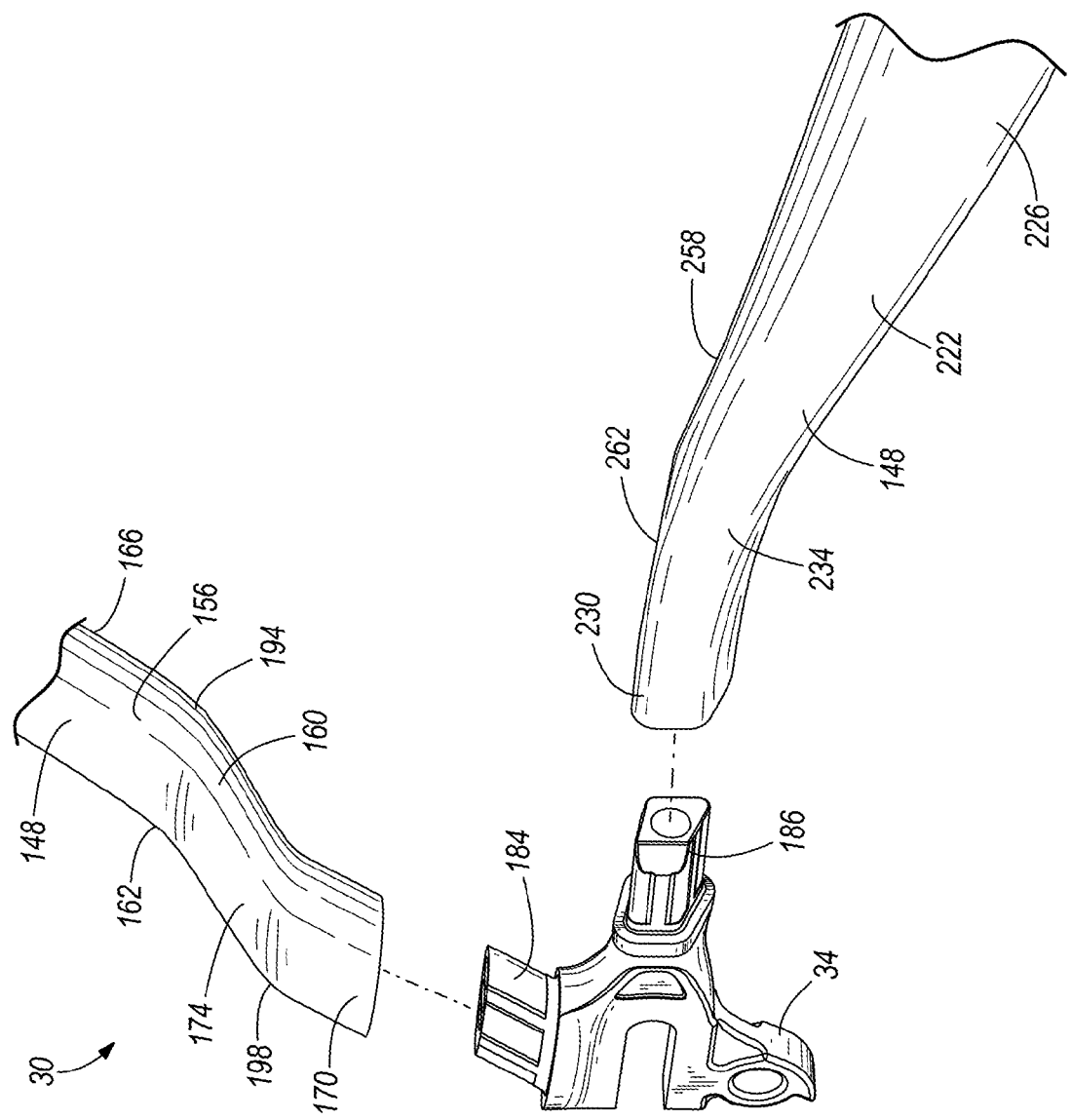
FIG. 6 is a perspective view of portions of rear stays of the frame of FIG. 1 illustrating a dropout exploded from the rear stays.

In the illustrated construction, the outer surface 156 of the rear portion 170 is generally parallel to the center plane 36 of bicycle 12. In other constructions, the outer surface 156 of the rear portion 170 can be angled with respect to the center plane 36. Referring to FIG. 6, the rear portion 170 receives the rear dropout 34. The dropout 34 includes a seatstay bonding plug 184 and a chainstay bonding plug 186. In the illustrated construction, the seatstay bonding plug 184 is aero-shaped such that the plug 184 can be inserted into the aero-shaped seatstay 140 (see FIG. 3).

Referring to FIGS. 2A and 2B, the steep portion 174 of the seatstay 140 includes a front end 190 coupled to the front portion 166 of the seatstay 140 and a rear end 192 coupled to the rear portion 170 of the seatstay 140. A front transition bend 194 is located between the steep portion 174 and the front portion 166 of the seatstay 140 and a rear transition bend 198 is located between the steep portion 174 and the rear portion 170 of the seatstay 140. The front transition bend 194 defines a front bend axis 200 and the rear transition bend 198 defines a rear bend axis 202. In the illustrated construction, the front and rear bend axes 200 and 202 are parallel to the ground surface 26 (see FIG. 7). Because the front and rear bend axes 200 and 202 are parallel to the ground surface 26, the leading edge 160 of the steep portion 174 is directly in front of the trailing edge 162. Alternatively stated, the major axes of the seatstay 140 at the steep portion 174 (see FIG. 9) are parallel to the ground surface 26. Accordingly, the leading edge 160 and the trailing edge 162 are properly positioned with respect to oncoming wind to reduce the amount of wind resistance or drag created by the seatstay 140, particularly the steep portion 174.

Referring to FIGS. 2A and 2B, the steep portion 174 defines a length 204 measured from the front bend axis 200 to the rear bend axis 202. In the illustrated construction the length 204 of the steep portion 174 is approximately 15 percent of the length 176 of the front portion 166. In other constructions, the length 204 of the steep portion 174 can range from about 10 percent to about 20 percent of the length 176 of the front portion 166. In yet other constructions, the length 204 of the steep portion 174 can range from about 5 percent to about 30 percent of the length 176 of the front portion 166.

The outer surface 156 of the steep portion 174 defines a steep angle 210 with respect to the center plane 36. In the illustrated construction, the steep angle 210 is approximately 50 degrees. In other constructions, the steep angle 210 can range from about 35 degrees to about 65 degrees. In yet other constructions, the steep angle 210 can range from about 25 degree to about 75 degrees. The steep angle 210 and the proximity of the steep portion 174 to the rear dropouts 34 and cassette 138 position the front portions 166 of the seatstays 140 and 142 relatively close to the center plane 36, and therefore, reduce the amount of drag or wind resistance created by the seatstays 140 and 142.

Figure 3:
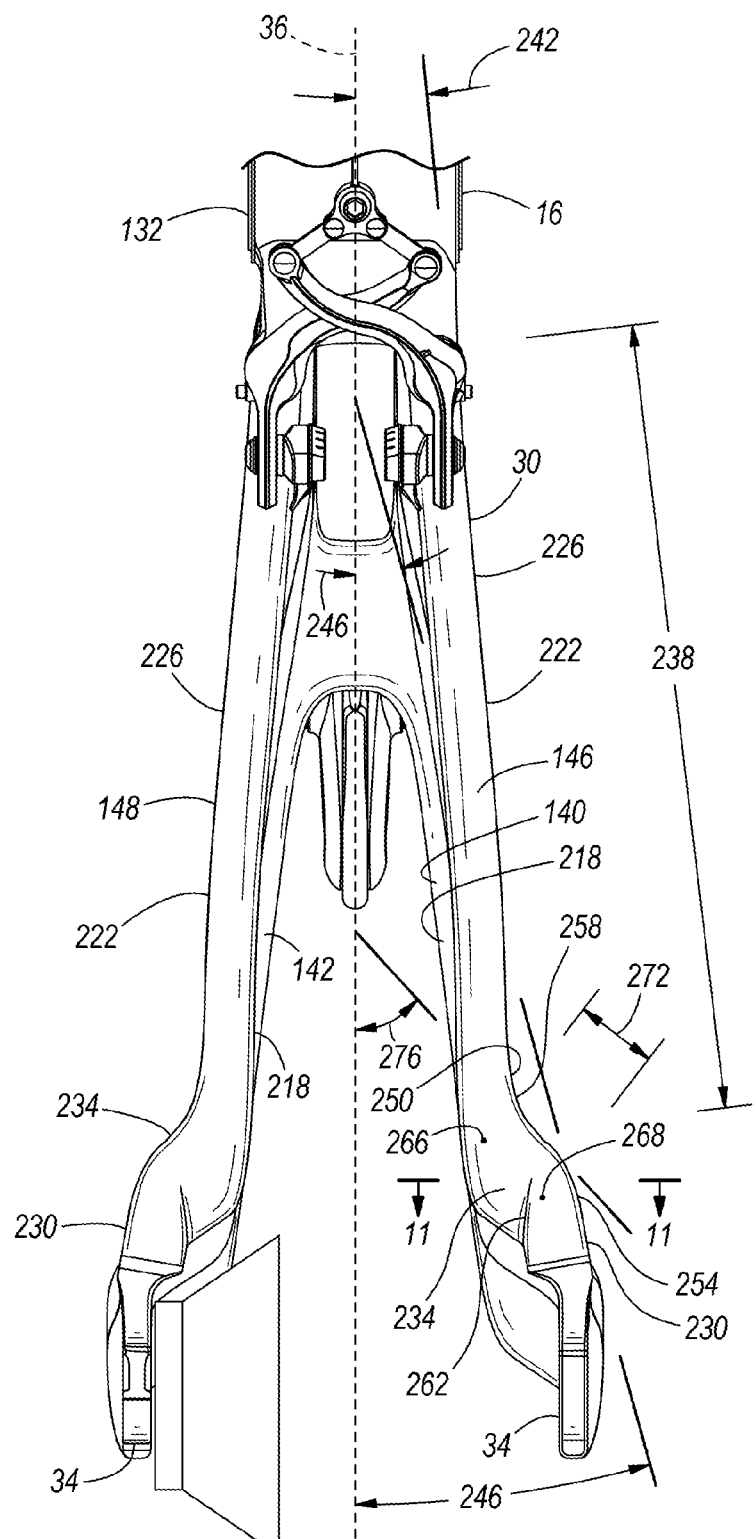
FIG. 3 is a view of the frame of FIG. 1 taken along line 3-3 of FIG. 1.

Referring to FIGS. 1 and 3, the chainstays 146 and 148 are coupled to the bottom bracket 132 and interconnect the bottom bracket 132 and the rear dropout 34. The chainstays 146 and 148 are similar, and therefore, only the left chainstay 146 will be described in detail below and like components and portions have been given the same reference number.

The chainstay 146 includes an inner surface 218 that generally faces toward the rear wheel 22 and an outer surface 222 that generally faces opposite the inner surface 218 or away from the rear wheel 22.

The chainstay 146 further includes a front portion 226, a rear portion 230, and a steep portion 234 between the front and rear portions 226 and 230. The front portion 226 has a length 238 and the outer surface 222 of the front portion 226 defines a front angle 242 with respect to the center plane 36 of the bicycle 12. In the illustrated construction, the front angle 242 is approximately 5 degrees. In other constructions, the front angle 242 can range from about 5 degrees to about 25 degrees. In yet other constructions, the front angle 242 can range from about 0 degrees (i.e., parallel to the center plane 36) to about 50 degrees.

The outer surface 222 of the rear portion 230 defines a rear angle 246 with respect to the center plane 36 of the bicycle 12. In the illustrated construction, the rear angle 246 is approximately 15 degrees. In other constructions, the rear angle 246 can range from about 0 degrees to about 30 degrees. Referring to FIG. 6, the rear portion 230 receives the chainstay bonding plug 186 of the rear dropout 34 to couple the rear dropout 34 to the chainstay 148.

Referring to FIG. 3, the steep portion 234 of the chainstay 146 includes a front end 250 coupled to the front portion 226 of the chainstay 146 and a rear end 254 coupled to the rear portion 230 of the chainstay 146. A front transition bend 258 is located between the steep portion 234 and the front portion 226 of the chainstay 146 and a rear transition bend 262 is located between the steep portion 234 and the rear portion 230 of the chainstay 146. The front transition bend 258 defines a front bend axis 266 and the rear transition bend 262 defines a rear bend axis 268. Referring to FIGS. 1 and 7, in the illustrated construction, the front and rear bend axes 266 and 268 are normal to the ground surface 26.

Referring to FIGS. 2A and 2B, the steep portion 234 defines a length 272 measured from the front bend axis 266 to the rear bend axis 268. In the illustrated construction the length 272 of the steep portion 234 is approximately 10 percent of the length 238 of the front portion 166. In other constructions, the length 272 of the steep portion 234 can range from about 5 percent to about 30 percent of the length 238 of the front portion 226.

Referring to FIG. 3, the outer surface 222 of the steep portion 234 defines a steep angle 276 with respect to the center plane 36. In the illustrated construction, the steep angle 276 is approximately 45 degrees. In other constructions, the steep angle 276 can range from about 35 degrees to about 65 degrees. In yet other constructions, the steep angle 276 can range from about 25 degree to about 75 degrees. The steep angle 276 and the proximity of the steep portion 234 to the rear dropouts 34 and cassette 138 position the front portions 226 of the chainstays 146 and 148 relatively close to the central plane 36 in order to reduce the amount of drag or wind resistance created by the chainstays 146 and 148.

Various features and advantages of the invention are set forth in the following claims.

The invention claimed is:

1. A bicycle comprising:
a main frame;
a front wheel mounted for rotation relative to the main frame;
a rear dropout;
a rear wheel mounted for rotation relative to the rear dropout about an axis, the rear wheel defining a center plane of the bicycle, wherein the rear wheel is driven by a chain; and
a seat stay coupling the rear dropout to the main frame, the seat stay having an inner surface facing the rear wheel and an outer surface facing away from the rear wheel, the seat stay including a steep portion having an outer surface disposed at a steep angle of between about 25 degrees and about 75 degrees relative to the center plane,
wherein at least a portion of the steep portion is disposed outboard of the chain, and
wherein the rear wheel has an outer circumference and the steep portion is located on the seat stay closer to the axis than the outer circumference.

2. The bicycle of claim 1, wherein the steep angle is between about 35 degrees and about 65 degrees relative to the center plane.

3. The bicycle of claim 1, wherein the steep angle is about 50 degrees relative to the center plane.

4. The bicycle of claim 1, wherein the steep portion includes a front end and a rear end, wherein the rear end is closer to the dropout than the front end, and wherein the seat stay further includes a front portion coupled to the front end of the steep portion, the front portion having an outer surface at a front angle of between about 0 degrees and about 50 degrees relative to the center plane.

5. The bicycle of claim 4, wherein the front angle is between about 5 degrees and about 25 degrees relative to the center plane.

6. The bicycle of claim 4, wherein the front angle is about 10 degrees relative to the center plane.

7. The bicycle of claim 4, wherein a length of the steep portion is between about 5 percent and about 30 percent of a length of the front portion.

8. The bicycle of claim 1, wherein a length of the steep portion is about 15 percent of a length of the front portion.

9. A bicycle comprising:
a main frame;
a front wheel mounted for rotation relative to the main frame;
a rear dropout;
a rear wheel mounted for rotation relative to the rear dropout about an axis, the rear wheel defining a center plane of the bicycle and having an outer circumference, and wherein the rear wheel has an outer circumference;
a seat stay coupling the rear dropout to the main frame, the seat stay having an inner surface facing the rear wheel and an outer surface facing away from the rear wheel, the seat stay including a first steep portion disposed at a steep angle of between about 25 degrees and about 75 degrees relative to the center plane; and
a chain stay coupling the rear dropout to the main frame, the chain stay having an inner surface facing the rear wheel and an outer surface facing away from the rear wheel, the chain stay including a second steep portion disposed at a steep angle of between about 25 degrees and about 75 degrees relative to the center plane,
wherein the first steep portion is located on the seat stay closer to the axis than the outer circumference.

10. The bicycle of claim 9, wherein the second steep portion is located on the chain stay closer to the axis than to the outer circumference.

11. The bicycle of claim 9, wherein the steep angle for each of the first and second steep portions is between about 35 degrees and about 65 degrees relative to the center plane.

12. The bicycle of claim 9, wherein the steep angle for each of the first and second steep portions is about 50 degrees relative to the center plane.

13. The bicycle of claim 9, wherein the first steep portion includes a front end and a rear end, wherein the rear end is closer to the dropout then the front end, and wherein the seat stay further includes a front portion coupled to the front end of the steep portion, the front portion having an outer surface disposed at a front angle of between about 0 degrees and about 50 degrees relative to the center plane.

14. The bicycle of claim 13, wherein the front angle is between about 5 degrees and about 25 degrees relative to the center plane.

15. The bicycle of claim 13, wherein the front angle is about 10 degrees relative to the center plane.

16. The bicycle of claim 13, wherein a length of the first steep portion is between about 5 percent and about 30 percent of a length of the front portion.

17. The bicycle of claim 9, wherein the second steep portion includes a front end and a rear end, wherein the rear end is closer to the dropout then the front end, and wherein the chain stay further includes a front portion coupled to the front end of the steep portion, the front portion having an outer surface disposed at a front angle of between about 0 degrees and about 50 degrees relative to the center plane.

18. The bicycle of claim 17, wherein the front angle is between about 5 degrees and about 25 degrees relative to the center plane.

* * * * *